(12) United States Patent
Niyogi

(10) Patent No.: US 10,402,255 B1
(45) Date of Patent: Sep. 3, 2019

(54) ALGORITHM FOR AGGREGATING RELEVANT LOG STATEMENTS FROM DISTRIBUTED COMPONENTS, WHICH APPROPRIATELY DESCRIBES AN ERROR CONDITION

(71) Applicant: Veritas Technologies LLC, Mountain View, CA (US)

(72) Inventor: Subhadip Niyogi, Roseville, MN (US)

(73) Assignee: Veritas Technologies LLC, Mountain View, CA (US)

( * ) Notice: Subject to any disclaimer, the term of this patent is extended or adjusted under 35 U.S.C. 154(b) by 12 days.

(21) Appl. No.: 15/004,572

(22) Filed: Jan. 22, 2016

(51) Int. Cl.
G06F 11/00 (2006.01)
G06F 11/07 (2006.01)

(52) U.S. Cl.
CPC ........ G06F 11/079 (2013.01); G06F 11/0709 (2013.01); G06F 11/0751 (2013.01); G06F 11/0775 (2013.01); G06F 11/0787 (2013.01)

(58) Field of Classification Search
CPC ............. G06F 11/0769; G06F 11/0775; G06F 11/079; G06F 11/0787
USPC ..................................................... 714/26, 54
See application file for complete search history.

(56) References Cited

U.S. PATENT DOCUMENTS

| 7,631,222 | B2 * | 12/2009 | Hasan | H04L 41/0631 714/26 |
| 7,634,563 | B2 * | 12/2009 | Menard | G06Q 30/06 709/203 |
| 7,904,757 | B2 * | 3/2011 | Niikkonen | G06F 11/0715 714/18 |
| 8,392,760 | B2 * | 3/2013 | Kandula | G06F 11/0709 714/25 |
| 8,806,277 | B1 * | 8/2014 | Mullangath | G06F 11/0709 714/26 |
| 2008/0065928 | A1 * | 3/2008 | Suzuki | G06F 11/0709 714/3 |
| 2010/0318847 | A1 * | 12/2010 | Beg | G05B 23/0243 714/26 |
| 2014/0172919 | A1 * | 6/2014 | Johnston | H04L 41/069 707/797 |
| 2014/0219107 | A1 * | 8/2014 | Racz | H04L 41/0631 370/242 |
| 2015/0170037 | A1 * | 6/2015 | Lvin | G06N 5/04 706/52 |
| 2015/0280968 | A1 * | 10/2015 | Gates | G06F 11/0709 714/37 |

(Continued)

*Primary Examiner* — Elmira Mehrmanesh
(74) *Attorney, Agent, or Firm* — Patent Law Works LLP

(57) ABSTRACT

A method for aggregating relevant log statements from distributed components is provided. The method includes representing a plurality of error codes of an application as nodes in a graph, with each of the plurality of error codes connected to at least one other of the plurality of error codes by a causal relationship represented in the graph. The method includes determining causal relationships among a plurality of log statements from distributed components, based on correlating error codes in the plurality of log statements in accordance with causal relationship connections represented in the graph, and determining a subset of information from the plurality of log statements as one or more single composite events, each comprising a plurality of error codes, in causal relationship in accordance with the graph, based on the determining the causal relationships.

19 Claims, 5 Drawing Sheets

(56) References Cited

U.S. PATENT DOCUMENTS

2015/0281011 A1* 10/2015 Gates .................... H04L 41/065
 709/224
2016/0179598 A1* 6/2016 Lvin ..................... G06F 11/079
 714/48

* cited by examiner

Directed Graph Causal Relationships Among Error Codes

ALGORITHM FOR AGGREGATING RELEVANT LOG STATEMENTS FROM DISTRIBUTED COMPONENTS, WHICH APPROPRIATELY DESCRIBES AN ERROR CONDITION

BACKGROUND

In hosted services, components of an application are distributed across customer data centers and one or more cloud platforms. For application support engineers to debug customer issues, there is a need to have centralized access to application error logs from a distributed environment. There are, today, open source components available which provide a centralized log aggregation solution. But, even with aggregated log statements in such a centralized log aggregation solution, the application support engineers must search through large amounts of log data. Application support engineers may not receive identical training, or have identical levels of experience, which can give rise to uneven support. Communication about error logs back to software development and lifecycle management teams can be inconsistent, ad hoc, and anywhere from incomplete to too voluminous. Therefore, there is a need in the art for a solution which overcomes the drawbacks described above.

SUMMARY

In some embodiments, a processor-based method for aggregating relevant log statements from distributed components is provided. The method includes representing a plurality of error codes of an application as nodes in a computer-readable graph, with each of the plurality of error codes connected to at least one other of the plurality of error codes by a causal relationship represented in the graph. The method includes determining causal relationships among a plurality of log statements from distributed components or one or more instances of the application, based on correlating error codes in the plurality of log statements in accordance with causal relationship connections represented in the graph, and determining a subset of information from the plurality of log statements as one or more single composite events, each comprising a plurality of error codes, in causal relationship in accordance with the graph, based on the determining the causal relationships.

In some embodiments, a tangible, non-transitory, computer-readable media having instructions thereupon which, when executed by a processor, cause the processor to perform a method is provided. The method includes accessing a directed graph that represents a plurality of error codes of an application as nodes connected by a plurality of causal relationships, and correlating error codes in a plurality of log statements from distributed components or instances of the application, in accordance with the causal relationships represented in the directed graph. The method includes determining causal relationships among the plurality of log statements, based on the correlating, and reporting one or more single composite events, each with a subset of information from the plurality of log statements and comprising a plurality of error codes in causal relationship, based on the determining.

In some embodiments, a system for aggregating relevant log statements from distributed components is provided. The system includes a memory, configured to have a directed graph that represents a plurality of error codes of an application as nodes with causal relationships, and a processor, configured to perform actions. The actions include correlating error codes in a plurality of log statements from distributed components or instances of the application, based on the nodes and the causal relationships in the directed graph, and analyzing causal relationships among the plurality of log statements, based on the correlating. The actions include determining one or more single composite events, each having a plurality of error codes from the plurality of log statements, in causal relationship, based on the analyzing.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

In the system and related method described herein, error log statements from distributed components of an application, or distributed instances of the application, are analyzed to find causal relationships. A subset of the information from the log statements is then reported as single composite events. Causal relationships among error codes of an application are represented in a directed graph, which is used by an analyzer to correlate error codes among the error log statements. The single composite event reports error codes from the error log statements in causal relationship in accordance with the directed graph, and can report further information such as information about error conditions for the error codes, or a list of conditions or a sequence for error events, in various embodiments.

Figure 1A:
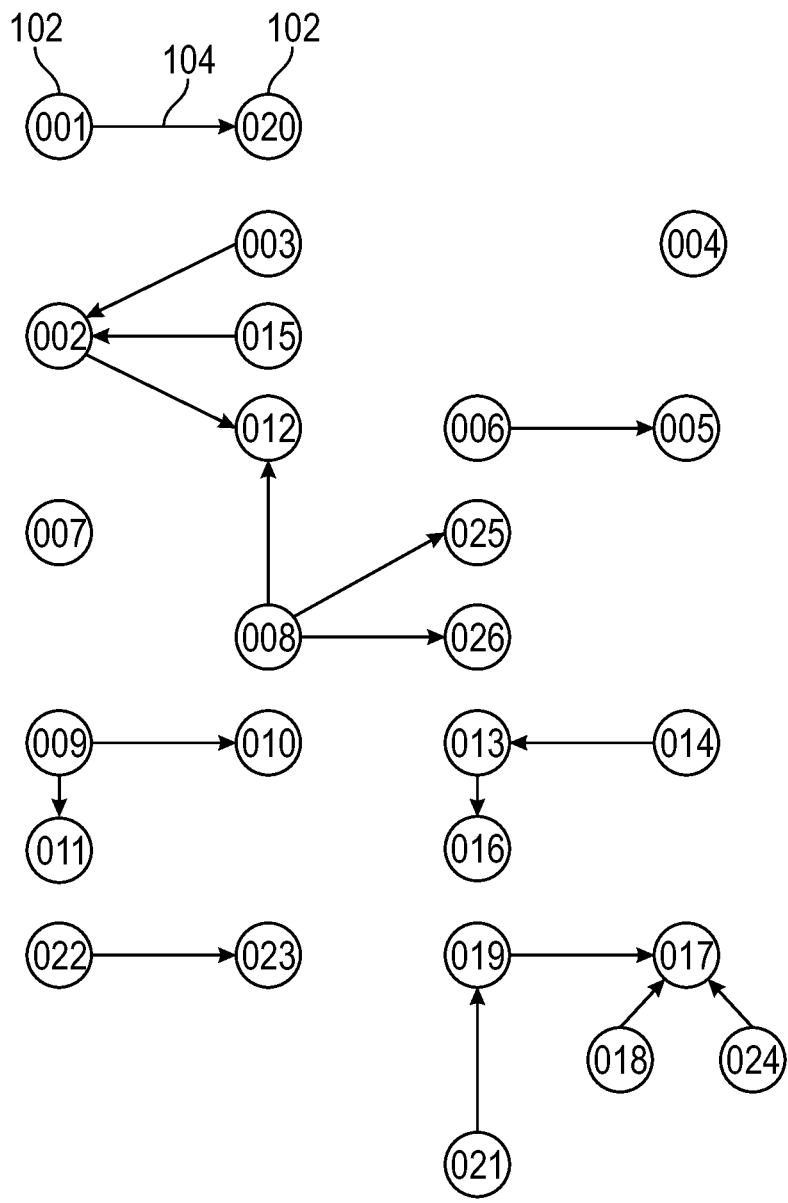
FIG. 1A illustrates a directed graph showing causal relationships among error codes for an application.

FIG. 1A illustrates a directed graph showing causal relationships among error codes for an application. In graph theory, a branch of mathematics, a directed graph is a graph with nodes 102 (or vertices or points, in some descriptions) connected by edges 104, and each edge has a direction. Usually, the direction is indicated by an arrow. Meaning for the edge 104 and the direction of the edge can be defined in many ways, and captures a relationship between the nodes 102 connected by the edge. A node 102 with only adjacent tails of arrows touching the node 102 is called a source. A node 102 with only adjacent heads of arrows touching the node 102 is called a sink. A node 102 with one or more tails and one or more heads touching the node 102 is neither a source nor a sink, and is called an internal. A node 102 with no heads and no tales touching the node 102 is called an isolated node. Examples of these in FIG. 1 include source nodes 102 labeled "001", "008" and "009", sink nodes labeled "012", "017" and "020", internal nodes labeled "013" and "019", and isolated nodes labeled "004" and "007".

Figure 1A:
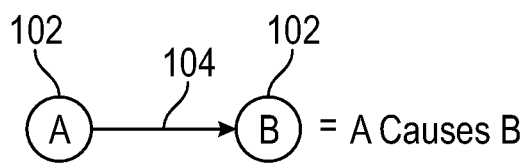

Many types of graphs, including directed graphs such as shown in FIG. 1, can be represented in databases that are computer-readable and imported, generated or resident in memory of a computer. Present embodiments use a directed graph to represent causal relationships among error codes of an application. Each error code is represented as a node 102 in the graph. For example, error codes 001 through 026 are shown as labels in nodes 102. Edges 104 represent the relationship "causes", for example as in A causes B. This is illustrated in the legend of the graph as a node 102 labeled "A" connected to a node 102 labeled "B" by an arrow pointing from A to B as an edge 104 connecting the two nodes 102. Equivalently, the relationship could be "is caused by", with the arrow pointing in the opposite direction. Various edges 104 couple various nodes 102 in various combinations, showing the causal relationships among error codes of the application. Although unidirectional arrows are shown, it is conceivable that some error codes could be related by bidirectional arrows, or two, oppositely pointing unidirectional arrows.

As examples of nodes 102 and edges 104 shown in FIG. 1, the error condition with the error code 001 causes the error condition with the error code 020, the error condition with the error code 009 causes both the error conditions with error codes 010 and 011, and so on. Error conditions with error codes 004 and 007 are shown as isolated nodes 102. The error condition with the error code 012 is caused by the error condition with the error code 002 or the error condition with the error code 008 or, equivalently, the error code 008 or the error code 002 causes the error code 012. In a shorthand notation, one error code can cause another error code. Examples of error conditions (each having an error code) could include communication failure, failure to authenticate, data is not in a correct format (i.e., a formatting error), data or a name already exists (e.g., a duplication error), etc. In further embodiments, a graph could represent other types of relationships among error codes or other information in log statements.

Graph theory, directed graphs, and software products that can generate directed graphs as computer-readable databases are known. In present embodiments, the graph that represents the error codes and the causal relationships among error codes could be generated by graph-generating software that poses queries, which are answered by knowledgeable software development engineers familiar with the application and the relationships among the error codes. Automated generation of the directed graph using artificial intelligence and computer monitoring of operating conditions and error conditions of the application is contemplated. In some embodiments, a graph is shipped with the application.

Figure 1B:
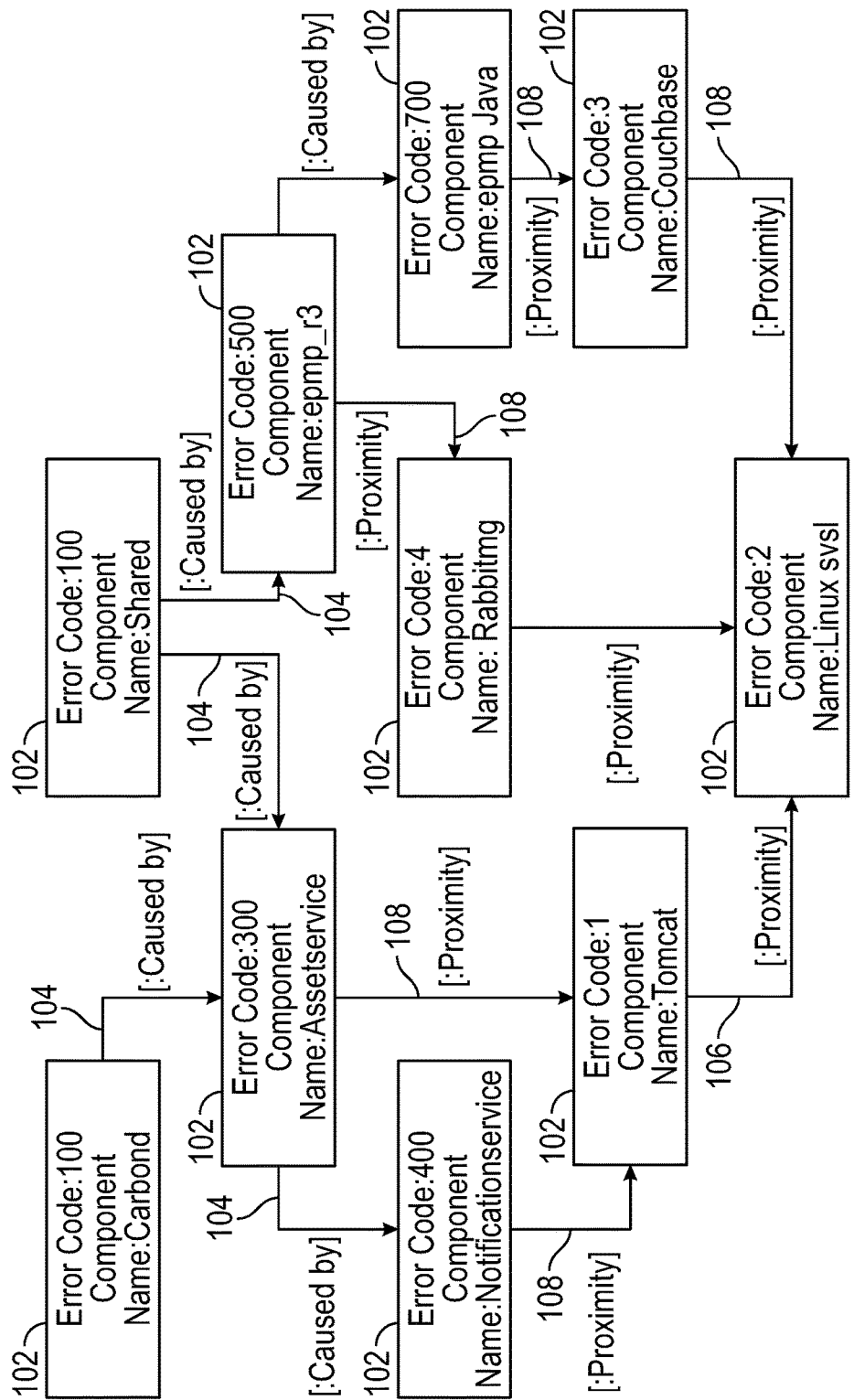
FIG. 1B is an example of a specific directed graph showing causal and proximity relationships among error codes as logged for an application and mapped to a directed graph.

FIG. 1B is an example of a specific directed graph showing causal and proximity relationships among error codes as logged for an application and mapped to a directed graph. This example shows two types of relationships. Causal relationship is depicted by an arrow or directional edge 104 that carries the meaning "is caused by", in which the error code of a node 102 at the base or tail of the arrow is caused by the error code of the node 102 at the head of the arrow. In some versions, the error code at the head of the arrow is caused by the error code at the base or tail of the arrow. The "caused by" relationship is used for co-relation of error events that occur between components and which have unique error codes. Choice of convention for the direction of the arrow is an implementation detail and may be specific to an embodiment.

Proximity relationship is showed by a directionless edge 106, which has no arrowhead, or a directional edge 108, which has an arrowhead. In some versions, the proximity is temporal. Two error codes related by temporal proximity occur within a specified time of each other. That is, the two error codes connected by a directionless edge 106 are in time-based proximity. The "proximity" relationship is used to capture co-related error events based on time-based proximity, for correlating with external components, for example to capture database logs when an error occurs in one of the components. In versions using a directional edge 108, the direction of the arrow could indicate which error code preceded which error code in time.

Figure 2:
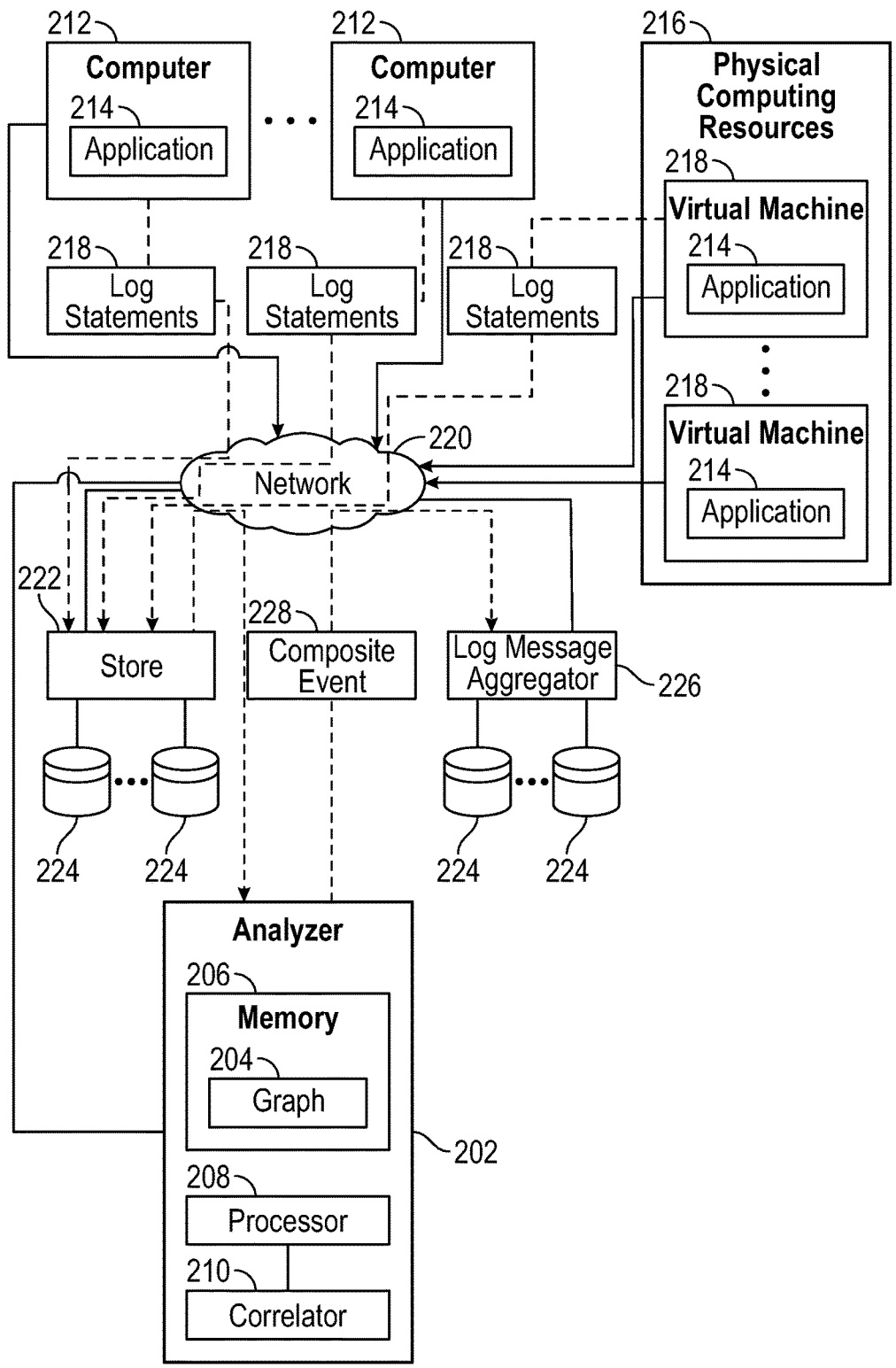
FIG. 2 is a system diagram showing distributed components or instances of an application sending log statements about errors, which are analyzed using the directed graph of FIG. 1, and then reported as composite events.

FIG. 2 is a system diagram showing distributed components or instances of an application 214 sending log statements about errors, which are analyzed using the directed graph of FIG. 1, and then reported as composite events. The graph 204 is imported into memory 206 of an analyzer 202, which has a processor 208 and a correlator 210. Or, the graph 204 is generated by the processor 208 and written into the memory 206. The analyzer 202 could be embodied as a programmed computer, with instructions from a tangible, computer-readable media. In some embodiments, the analyzer 202 is combined with either the store 222 or the log message aggregator 226, or both, while in others, these are at separate locations in the network 220. Virtual storage could be used, too. In further embodiments, the analyzer 202 is distributed and runs alongside of applications 214 or components of the application 214, in computers 212 and/or virtual machines 218. The correlator 210 and/or other components of the analyzer 202, even up to or including the entire analyzer 202, can be implemented in software, hardware, firmware, or various combinations thereof.

As illustrated in the scenario in FIG. 2, distributed instances of the application 214, or distributed components of the application 214, are operating in various computers 212 and/or virtual machines 218 implemented and physical computing resources 216. As an example, the application 214 could be part of a physical or virtual appliance. The applications 214 or components of the application 214 are sending log statements 218 through a network 220, which could be a local area network (LAN), a wide-area network (WAN), a wireless network, and/or the global communication network known as the Internet, or another network. Every error condition in a log statement 218 has an error code, and the error code uniquely identifies the error condition. A log statement may also have an error message, and further information. The log statements are gathered at a store 222, for example in storage memory 224 of the store 222. In some embodiments, the store 222 is a single store for all of the log statements 218 sent by the instances or components of the application 214. The analyzer 222 accesses the log statements 218 at the store 222, analyzes the log statements 218 as described below, and reports one or more composite events 228 through the network 222 a log message aggregator 226. Composite events 228 are stored in storage memory 224 of the log message aggregator 226. Application support, software development, and other interested persons or teams then access the composite events 228 at the log message aggregator 226, in order to support users of the application 214, debug application 214 software, develop next-generation software, etc. Now, the various support personnel can know not only information about an error, but what caused the error, and what other errors (if any) the error caused, without having to read and manually sort through large numbers of log statements 218 and data in the log statements 218.

The analyzer 202, and more specifically the processor 208 of the analyzer 202, correlates error codes in the log statements 218, based on the nodes 102 and the causal relationships among the nodes 102 as represented in the graph 204. This can be accomplished using the correlator 210. Based on this correlating, the analyzer 202 analyzes causal relationships among the log statements 218. Using results of this analysis, the analyzer 202 extracts or derives a subset of information from the log statements 218 and reports this to the log message aggregator 226 as one or more composite events 228. Each composite event 228 has two or more error codes that are in causal relationship, from the log statements 218, in accordance with the graph 204. Other information from the log statements 218 can be reported in a single composite event 228, such as information about error conditions for the error codes in the composite event 228, a list of conditions for error events associated with the error codes in causal relationship in the composite event 228, or a list, in sequence, of error events in causal relationship in the composite event 228. For example, error events listed in a composite event 228 could have sequence numbers in the order in which the error events occurred. In some embodiments, the analyzer 202 discards default information generated by an operating system as unrelated or irrelevant to the causal relationship in the error codes or the error conditions.

For example, referring to FIGS. 1 and 2, suppose various log statements 218 called out error codes 001 and 020, among others, in error events. Because these two error codes are in causal relationship in the example directed graph of FIG. 1, the analyzer can correlate these two error codes from the log statements 218 and determine that they belong together in a single composite event 228. Another composite event 228 could report an occurrence of error codes 013, 014 and 016 in causal relationship from the log statements 218. Each of these single composite events 228 could be reported along with information identifying which computer 212 or virtual machine 218 reported the error condition(s), or which instance or distributed component of an application 214 reported the error condition(s).

In some embodiments, an analysis of the log statements 218 and gathering of a subset of information for a composite event 228 is performed as postprocessing of log statements 218 from the single store 222. In some embodiments, this analysis and gathering of information for the composite event 228 is performed as preprocessing for the log message aggregator 226. In some situations, the analyzer 202 could correlate an error code from a log statement 218 from one instance or distributed component of the application 214 and an error code from another log statement 218 from another instance or distributed component of the application 214. This could occur, for example, when one instance or distributed component of the application 214 executing on one computer 212 or virtual machine 218 fails to communicate, or has an erroneous or faulty communication with another instance or distributed component of the application 214, so that the first error condition compounds itself and creates the second error condition at another computer 212 or virtual machine 218. Various further scenarios involving multiple computers 212 and/or virtual machines 218, and multiple instances or distributed components of the application 214, with various log statements 218 and correlations of error codes are readily devised in keeping with the teachings herein.

Figure 3:
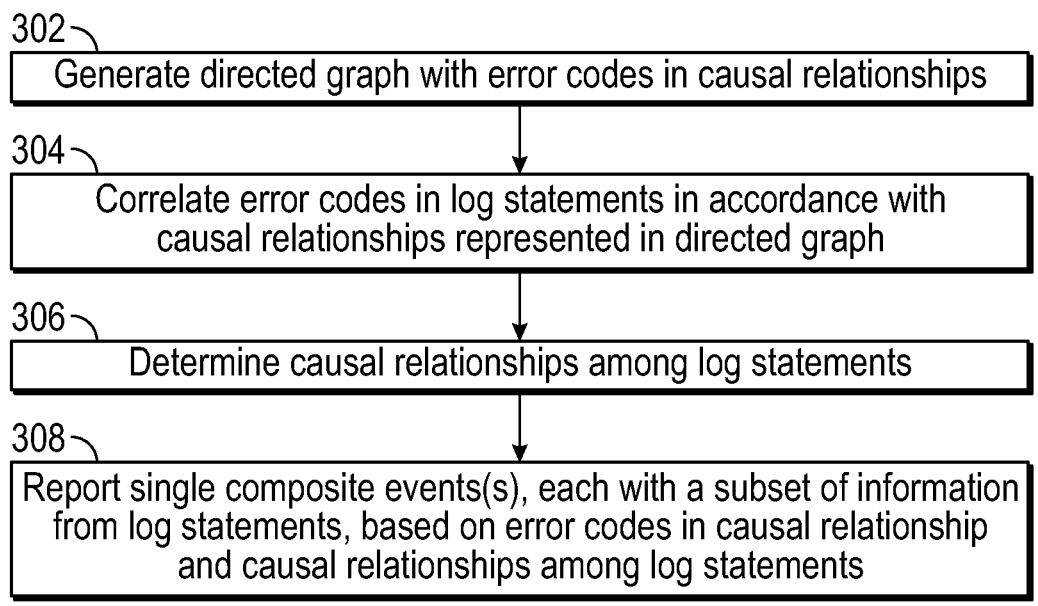
FIG. 3 is a flow diagram of a method for aggregating relevant log statements from distributed components, which can be practiced on or by the system shown in FIG. 2.

FIG. 3 is a flow diagram of a method for aggregating relevant log statements from distributed components, which can be practiced on or by the system shown in FIG. 2. The method can be practiced by a processor, for example the processor in the analyzer shown in FIG. 2. In a variation, the method could be practiced on log statements from a single instance of an application.

In an action 302, a directed graph with error codes and causal relationships is generated. The graph represents error codes of an application as nodes, and causal relationships among the error codes as edges with arrows, connecting various nodes. The graph could be generated as a database, using queries, and then imported into a memory of the analyzer.

In an action 304, error codes in log statements are correlated in accordance with causal relationships represented in the directed graph. The log statements are produced by distributed instances or components of the application, and could be sent to and stored in a single store. In an action 306, causal relationships among the log statements are determined. This is based on the correlating.

In an action 308, one or more single composite events are reported. Each composite event has a subset of information from the log statements, and is based on error codes in causal relationship, and causal relationships among the log statements. The composite events could be reported to a log message aggregator.

Figure 4:
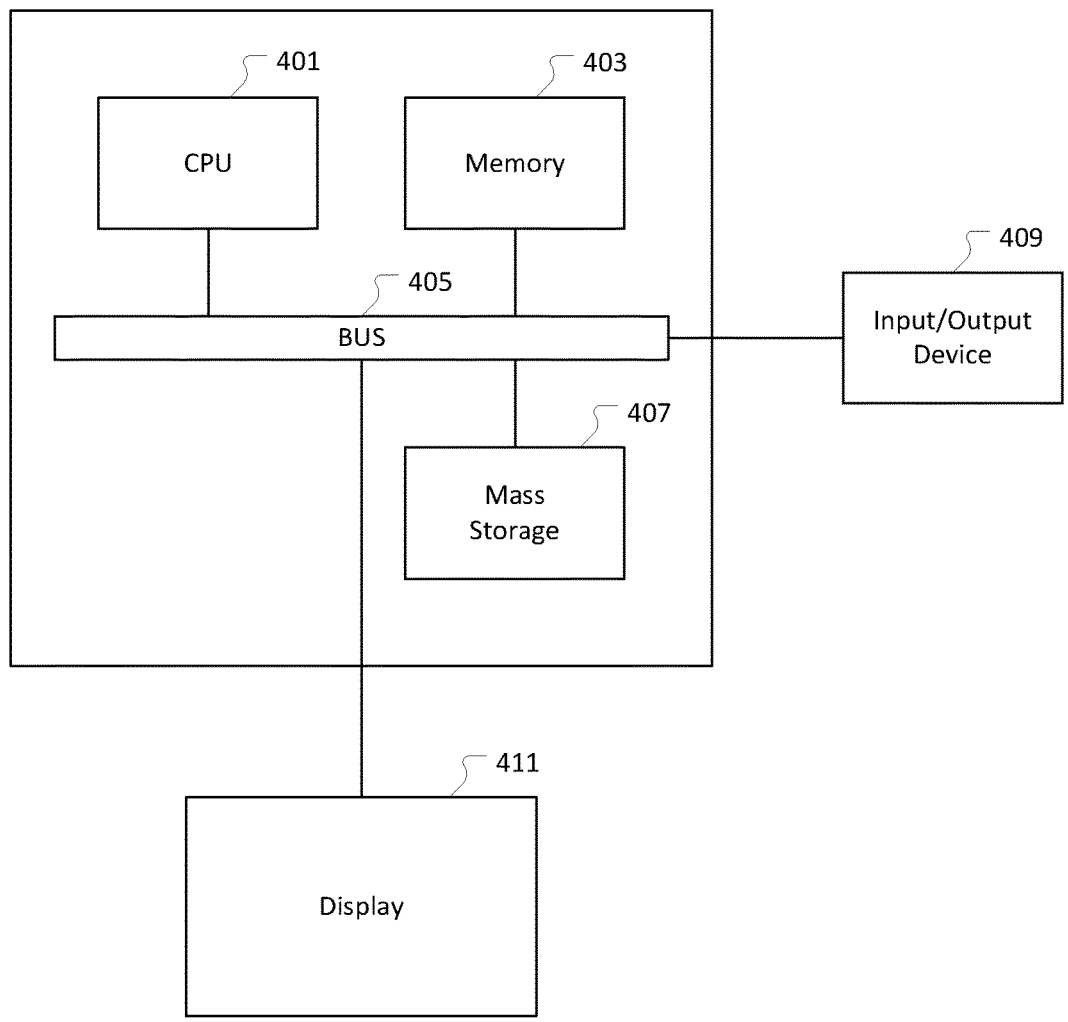
FIG. 4 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 4 is an illustration showing an exemplary computing device which may implement the embodiments described herein. The computing device of FIG. 4 may be used to perform embodiments of the functionality for aggregating relevant log statements in accordance with some embodiments. The computing device includes a central processing unit (CPU) 401, which is coupled through a bus 405 to a memory 403, and mass storage device 407. Mass storage device 407 represents a persistent data storage device such as a floppy disc drive or a fixed disc drive, which may be local or remote in some embodiments. The mass storage device 407 could implement a backup storage, in some embodiments. Memory 403 may include read only memory, random access memory, etc. Applications resident on the computing device may be stored on or accessed via a computer readable medium such as memory 403 or mass storage device 407 in some embodiments. Applications may also be in the form of modulated electronic signals modulated accessed via a network modem or other network interface of the computing device. It should be appreciated that CPU 401 may be embodied in a general-purpose processor, a special purpose processor, or a specially programmed logic device in some embodiments.

Display 411 is in communication with CPU 401, memory 403, and mass storage device 407, through bus 405. Display 411 is configured to display any visualization tools or reports associated with the system described herein. Input/output device 409 is coupled to bus 405 in order to communicate information in command selections to CPU 401. It should be appreciated that data to and from external devices may be communicated through the input/output device 409. CPU

401 can be defined to execute the functionality described herein to enable the functionality described with reference to FIGS. 1-3. The code embodying this functionality may be stored within memory 403 or mass storage device 407 for execution by a processor such as CPU 401 in some embodiments. The operating system on the computing device may be MS DOS™, MS-WINDOWS™, OS/2™, UNIX™, LINUX™, or other known operating systems. It should be appreciated that the embodiments described herein may also be integrated with a virtualized computing system implemented by physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A processor-based method for aggregating relevant log statements from distributed components, comprising:
   representing a plurality of error codes of an application as nodes in a computer-readable directed graph stored in a memory, with each of the plurality of error codes connected to at least one other of the plurality of error codes by a causal relationship represented in the directed graph;
   determining causal relationships among a plurality of error log statements from a plurality of distributed instances of the application or distributed components of the application, based on correlating error codes in the plurality of error log statements in accordance with causal relationship connections represented in the directed graph;
   determining one or more single composite events for the distributed instances of the application or distributed components of the application, each composite event comprising a plurality of error codes, in causal relationship in accordance with the directed graph, based on the determining the causal relationships; and
   generating a report of the one or more composite events;
   wherein at least one of the determined single composite events is associated with a compound error in which a first error condition, at a first one of the distributed instances of the application or distributed components of the application, generates an erroneous or faulty communication resulting in a second error condition at a second one of the distributed instances of the application or the distributed components of the application.

2. The method of claim 1, wherein each single composite event further comprises information about error conditions for one or more of the plurality of error codes in the causal relationship.

3. The method of claim 1, further comprising:
   aggregating the plurality of error log statements at a single store, wherein the determining the causal relationships is from the single store.

4. The method of claim 1, wherein the determining one or more composite events comprises:
   discarding default information generated by an operating system as irrelevant to the causal relationship in the plurality of error codes.

5. The method of claim 1, further comprising:
   determining a causal relationship relating a first error code in a first error log statement from a first one of the distributed components or instances of the application to a second error code in a second error log statement from a second one of the distributed components or instances of the application, based on correlating the first error code and the second error code in accordance with the causal relationship connections represented in the directed graph.

6. The method of claim 1, wherein the representing the plurality of error codes in the directed graph comprises:
   processing results of a plurality of queries; and
   generating the directed graph as a database, based on the processing the results.

7. A tangible, non-transitory, computer-readable media having instructions thereupon which, when executed by a processor, cause the processor to perform a method comprising:
   accessing a directed graph stored in a memory that represents a plurality of error codes of an application as nodes connected by a plurality of causal relationships;
   correlating error codes in a plurality of log statements from a plurality of instances of the application or distributed components of the application, in accordance with the causal relationships represented in the directed graph;
   determining causal relationships among the plurality of log statements, based on the correlating; and
   reporting one or more single composite events, each comprising a plurality of error codes in causal relationship, based on the determining;
   wherein at least one of the single composite events is associated with a compound error in which a first error condition, at a first one of the distributed instances of the application or distributed components of the application, generates an erroneous or faulty communication resulting in a second error condition at a second one of the distributed instances of the application or the distributed components of the application.

8. The computer-readable media of claim 7, wherein a subset of information for each single composite event further comprises:
   a list of conditions for each of a plurality of error events associated with the plurality of error codes in causal relationship.

9. The computer-readable media of claim 7, wherein the method further comprises:
   preprocessing the plurality of log statements to form a subset of information in the one or more single composite events, wherein the reporting comprises sending a subset of information associated with one or more single composite events to an aggregator of log events.

10. The computer-readable media of claim 7, wherein the method further comprises:
    postprocessing the plurality of log statements from a single store to form a subset of information in the one or more single composite events, wherein the plurality of log statements is aggregated at the single store.

11. The computer-readable media of claim 7, wherein a subset of information excludes default information added to the plurality of log statements by an operating system and unrelated to error conditions.

12. The computer-readable media of claim 7, wherein the correlating, determining and reporting comprise:
    correlating the error codes in log statements from first and second distributed components or instances of the application;
    determining a causal relationship of a first log statement from the first distributed component or instance of the application and a second log statement from the second distributed component or instance of the application; and
    reporting a single composite event with the causal relationship of the first log statement and the second log statement, relating error events in the first and second distributed components or instances of the application.

13. The computer-readable media of claim 7, wherein the method further comprises:
    generating the directed graph as a database, as a result of processing results of a plurality of queries.

14. A system for aggregating relevant log statements from distributed components, comprising:
    a memory, configured to have a directed graph that represents a plurality of error codes of an application as nodes with causal relationships; and
    a processor, configured to perform actions including:
        correlating error codes in a plurality of log statements from a plurality of distributed instances of the application or distributed components of the application, based on the nodes and the causal relationships in the directed graph;
        analyzing causal relationships among the plurality of log statements, based on the correlating; and
        determining one or more single composite events, each having a plurality of error codes from the plurality of log statements, in causal relationship, based on the analyzing;
    wherein at least one of the determined single composite events is associated with a compound error in which a first error condition, at a first one of the distributed instances of the application or distributed components of the application, generates an erroneous or faulty communication resulting in a second error condition at a second one of the distributed instances of the application or the distributed components of the application.

15. The system of claim 14, wherein each of the one or more single composite events includes a list, in sequence, of a plurality of error events in causal relationship.

16. The system of claim 14, wherein the actions further comprise:
    reporting the one or more single composite events to an aggregator of log events.

17. The system of claim 14, wherein the actions further comprise:
    accessing the plurality of log statements at a single store; and
    sending information about the one or more single composite events to a location differing from a location of the single store.

18. The system of claim 14, wherein the actions further comprise:
    determining a causal relationship connecting a first error code in a first log statement from a first one of the distributed components or instances of the application and a second error code in a second log statement from a second one of the distributed components or instances of the application, based on the analyzing.

19. The system of claim 14, wherein the actions further comprise:
    importing the directed graph to the memory as a database.

* * * * *